United States Patent
Flowers et al.

(10) Patent No.: US 8,792,620 B2
(45) Date of Patent: Jul. 29, 2014

(54) NON-INVASIVE DIAGNOSTIC TRANSMISSION LINE TESTING

(75) Inventors: Mark B. Flowers, Los Gatos, CA (US); Mark H. Brady, San Ramon, CA (US); Marc H. Goldburg, Redwood City, CA (US); Mark P. Mallory, Mukilteo, WA (US); Ardavan Maleki Tehrani, Menlo Park, CA (US)

(73) Assignee: Adaptive Spectrum and Signal Alignment, Inc., Redwood, CA (US)

( * ) Notice: Subject to any disclaimer, the term of this patent is extended or adjusted under 35 U.S.C. 154(b) by 0 days.

(21) Appl. No.: 13/696,798

(22) PCT Filed: May 10, 2010

(86) PCT No.: PCT/US2010/034267
§ 371 (c)(1),
(2), (4) Date: Mar. 4, 2013

(87) PCT Pub. No.: WO2011/142741
PCT Pub. Date: Nov. 17, 2011

(65) Prior Publication Data
US 2013/0170629 A1  Jul. 4, 2013

(51) Int. Cl.
*H04M 1/04* (2006.01)
*H04M 3/08* (2006.01)
*H04M 3/22* (2006.01)

(52) U.S. Cl.
USPC ............. 379/1.04; 379/22.02; 379/27.03

(58) Field of Classification Search
USPC ............. 379/1.01, 1.03, 1.04, 22.01, 22.02, 379/22.05, 22.07, 23, 24, 27.01, 27.03, 379/29.01, 31
See application file for complete search history.

(56) References Cited

U.S. PATENT DOCUMENTS

| | | | |
|---|---|---|---|
| 6,456,694 B1 * | 9/2002 | Posthuma | 379/1.04 |
| 6,534,996 B1 | 3/2003 | Amrany et al. | |
| 6,978,015 B1 * | 12/2005 | Erickson et al. | 379/417 |
| 7,010,025 B1 * | 3/2006 | Helfenstein et al. | 375/219 |
| 7,302,046 B2 * | 11/2007 | Kramer | 379/22.02 |
| 8,340,279 B2 * | 12/2012 | Jagannathan et al. | 379/417 |
| 2002/0169585 A1 * | 11/2002 | Jones et al. | 702/189 |
| 2003/0001586 A1 * | 1/2003 | Warke | 324/527 |
| 2004/0019443 A1 | 1/2004 | Jones et al. | |
| 2004/0044489 A1 * | 3/2004 | Jones et al. | 702/79 |
| 2005/0163287 A1 | 7/2005 | Ouyang et al. | |
| 2007/0116184 A1 * | 5/2007 | Gonsalves et al. | 379/1.01 |
| 2009/0161741 A1 * | 6/2009 | Ginis et al. | 375/224 |
| 2011/0142111 A1 * | 6/2011 | Sands et al. | 375/222 |
| 2013/0064279 A1 * | 3/2013 | Nielsen et al. | 375/227 |

OTHER PUBLICATIONS

International Search Report and Written Opinion for International Patent Application No. PCT/US2010/034267, Mailed Feb. 7, 2011, 11 pages.
International Preliminary Report on Patentability for International Patent Application No. PCT/US2010/034267, Mailed Nov. 22, 2012.

* cited by examiner

*Primary Examiner* — Binh Tieu
(74) *Attorney, Agent, or Firm* — Blakely Sokoloff Taylor & Zafman LLP

(57) ABSTRACT

A probing signal transmitted on a twisted pair telephone line in a DSL system is reflected and received at a DSL device. An estimate of one of a DSL data transmission signal or DSL synch symbol transmission signal is removed from the received probing signal to recover the reflected probing signal. The recovered reflected probing signal is processed to determine characteristics information of the twisted pair telephone line.

16 Claims, 8 Drawing Sheets

NON-INVASIVE DIAGNOSTIC TRANSMISSION LINE TESTING

CROSS-REFERENCE TO RELATED APPLICATIONS

This application claims the benefit of International Application No. PCT/US2010/034267, filed May 10, 2010, the entire contents of which are hereby incorporated by reference herein.

FIELD OF THE DISCLOSURE

This disclosure relates generally to communications networks and/or systems and, more particularly, to methods and apparatus to perform line testing.

BACKGROUND

Digital subscriber line (DSL) technology is commonly utilized to provide internet-related services to subscribers, such as, for example, homes and/or businesses (also referred to herein as users and/or customers). DSL technology enables customers to use telephone lines (e.g., ordinary twisted-pair copper telephone lines used to provide Plain Old Telephone System (POTS) services) to connect the customers to, for example, a high data rate broadband Internet network, broadband service and/or broadband content.

A service provider of a DSL service can use information such as loop length, cable gauge(s), presence of bridged tap(s), location of bridged tap(s), lengths of bridged tap(s), noise on the line, shorts, opens, etc. for trouble detection, trouble isolation and/or trouble prevention. Alternatively or additionally, it may be useful to have similar information concerning the telephone line before DSL service is offered, sold and/or provisioned to a potential DSL subscriber, from the service provider's location to the subscriber's location. Information such as that mentioned above is measured for the telephone line between the service provider's location and the subscriber's location. Existing line testing methods would disrupt the operation of the DSL line. For example prior art Single Ended line (SELT) testing methods are performed by sending a probe signal on the DSL lines, and measuring the reflection in order to estimate line characteristics, such as Return Loss or Line Impedance. This probing is done by disabling the operation of the DSL connection and performing the SELT testing. This would disrupt the DSL line operation, which would cause interruption of the DSL service to the customers. Therefore SELT testings are done typically during new customer signups, or when the DSL line has a problem. This would avoid causing service disruptions, however it prevents the service provider from having an up-to-date information on the status of the line.

Embodiments of the present invention overcome the above problems. The present invention provides methods and systems for performing DSL line testing, without disrupting the operation of the DSL line connection that is being tested. Therefore, it enables service providers to be able to probe the DSL line at any time, in order to have up-to-date information on the status of the DSL lines.

A line testing device (i.e. tester), operative to be located at a customer premises, causes the transmission of a probing signal into at least one telephone line. The tester computes a parameter that represents a characteristic of at least one telephone line based upon at least a measured reflected probing signal. Using any of a variety of method(s), technique(s) and/or algorithm(s), the testers compute the characterizing parameter(s) from the measured reflected probing signal. For example, with knowledge of what probing signal was transmitted, and given a received and/or measured reflected signal, a tester can, for example, compute an echo path response, detect the presence of a bridged tap, characterize a detected bridged tap, estimate a loop attenuation, and/or determine any suitable telephone line characteristic. In some circumstances, the measured reflected signals at the customer end of a telephone line will include a much greater level of detail about a customer premises environment and/or the telephone line than would be available from reflected signals at the other (e.g., CO or RT) end. Therefore, the tester provides an enhanced level of detailed diagnostics by performing one or more line test(s) from the customer premises 106.

While the following disclosure references the example digital subscriber line (DSL) system and/or the example of FIGS. 1-7, the methods and apparatus described herein may be used to characterize telephone lines for any variety, any size and/or any topology of DSL system. For example, a DSL system may include more than one DSL access multiplexer (DSLAM) located in more than one location and may include any number of telephone lines, DSL maintenance devices, testers, DSL modems and/or testers. Also, for example, at customer premises, a plurality of modems could terminate a plurality of telephone lines and share a single or a plurality of testers, data analyzers and/or computers. Additionally, although for purpose of explanation, the following disclosure refers to example systems, devices and/or networks illustrated in FIG. 1A, any additional and/or alternative variety and/or number of communication systems, devices and/or network(s) may be used to implement a DSL communication system and/or provide DSL communication services in accordance with the teachings disclosed herein. For example, the different functions collectively allocated among a DSL management center, a DSL access multiplexer (DSLAM), a DSL modem, a tester, computer, and/or a data analyzer as described below can be reallocated in any desired manner.

As used herein, the terms "user", "subscriber" and/or "customer" refer to a person, business and/or organization to which communication services and/or equipment are and/or may potentially be provided by any of a variety of service provider(s). Further, the term "customer premises" refers to the location to which communication services are being provided by a service provider. For an example public switched telephone network (PSTN) used to provide DSL services, customer premises are located at, near and/or are associated with the network termination (NT) side of the telephone lines. Example customer premises include a residence or an office building.

As used herein, the term "operative" may describe an apparatus capable of an operation and/or actually in operation. For example, an apparatus operable to perform some function describes a device turned off yet is capable of performing an operation, by virtue of programming or hardware for example, and/or a device turned on and performing the operation. The term "signal" typically refers to an analog signal, the term "data" typically refers to digital data and the term "information" may refer to either an analog signal and/or a digital signal although other meanings may be inferred from the context of the usage of these terms.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a DSL service provider offer services that diagnose or improve the DSL service.

As used herein, the term "subscriber equipment" refers to any equipment located at and/or in a customer premises for use in providing at least one subscriber service. The subscriber equipment may or may not be potentially available for additional purposes. While subscriber equipment is located at and/or in a customer premises, such equipment may be located on either side and/or both sides of a NT and/or any other network ownership demarcation. Subscriber equipment may be owned, rented, borrowed and/or leased by a subscriber. Subscriber equipment may be owned and entirely controlled by the service provider. For example, subscriber equipment could be owned by a service provider and the subscriber only plugs into a connector and has no other access and/or interaction with the device. Subscriber equipment is generally available to and/or accessible by the subscriber and may be acquired and/or obtained by the subscriber via any of a variety of sources including, but not limited to, a retailer, a service provider, and/or an employer. Example subscriber equipment includes a personal computer (PC), a set-top box (STB), a residential gateway and/or a DSL modem located at and/or in a subscriber's residence by which the subscriber receives and/or utilizes a DSL service and/or Internet services.

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed DSL (VDSL). Such DSL technologies are commonly implemented in accordance with an applicable standard such as, for example, the International Telecommunications Union (ITU) standard G.992.1 (a.k.a. G.dmt) for ADSL modems, the International Telecommunications Union (ITU) standard G.992.3 (a.k.a. G.dmt.bis, or G.adsl2) for ADSL2 modems, the International Telecommunications Union (ITU) standard G.992.5 (a.k.a. G.adsl2plus) for ADSL2+ modems, the International Telecommunications Union (ITU) standard G.993.1 (a.k.a. G.vdsl) for VDSL modems, the International Telecommunications Union (ITU) standard G.993.2 for VDSL2 modems, the International Telecommunications Union (ITU) standard G.994.1 (G.hs) for modems implementing handshake, and/or the ITU G.997.1 (a.k.a. G.ploam) standard for management of DSL modems.

In the interest of brevity and clarity, throughout the following disclosure references will be made to connecting a DSL modem and/or a DSL communication service to a customer. However, while the following disclosure is made with respect to example digital subscriber line (DSL) equipment, DSL services, DSL systems and/or the use of ordinary twisted-pair copper telephone lines for distribution of DSL services, it should be understood that the disclosed methods and apparatus to characterize and/or test a transmission medium for communication systems disclosed herein are applicable to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems and/or fiber optic networks. Additionally, combinations of these devices, systems and/or networks may also be used. For example, a combination of twisted-pair and coaxial cable connected by a balun, or any other physical-channel-continuing combination such as an analog fiber to copper connection with linear optical-to-electrical connection at an optical network unit (ONU) may be used.

It will be readily apparent to persons of ordinary skill in the art that connecting a DSL modem and/or tester to a customer involves, for example, communicatively connecting the DSL modem and/or tester operated by a communications company to a telephone line (i.e., a subscriber line) that is communicatively connected to a second DSL modem and/or tester located at and/or in a customer premises (e.g., a home and/or place of business owned, leased or otherwise occupied and/or utilized by the customer). The second DSL modem and/or tester may be further communicatively connected to another communication and/or computing device (e.g., a personal computer) that the customer operates to access a service (e.g., Internet access) via the first and second DSL modems and/or tester, the telephone line and the communications company.

SUMMARY

Figure 2:
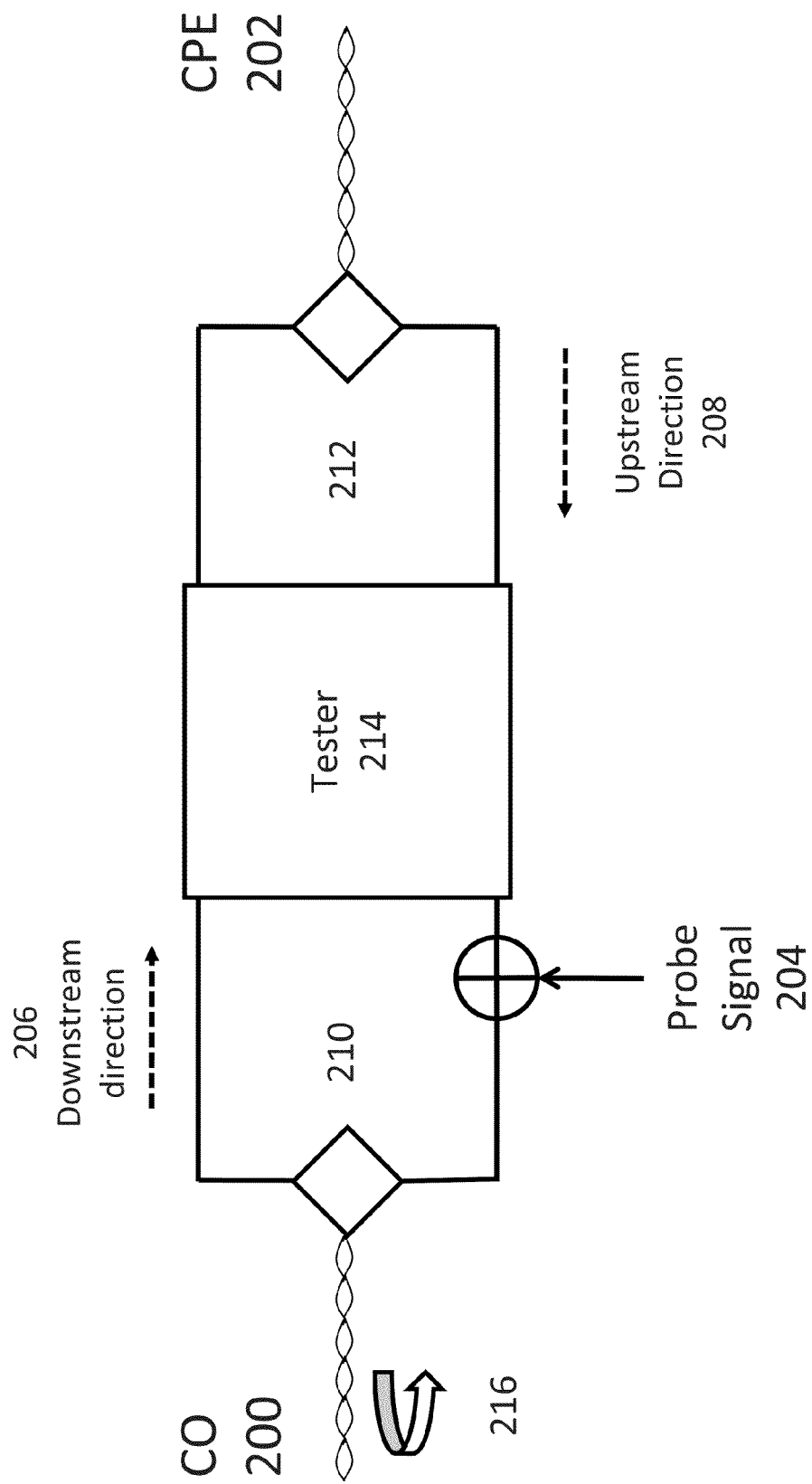
FIG. 2 is a schematic illustration of an example system diagram.

In one embodiment of the present invention a probing signal is sent on the DSL line from the line test device, and the reflected signal is received by the line test device. FIG. 2 shows an example diagram of the embodiment.

The transmitted probing signal could be transmitted on the downstream frequencies or on the upstream frequencies. The transmitted probing signal could also be transmitted in the upstream direction or in downstream direction. In one embodiment, for example the transmitted probing signal could be transmitted on the downstream frequencies in the upstream direction. Therefore, the probing signal will not interfere with the upstream transmission, because the frequencies in the upstream and downstream bands do not overlap. Such transmission could happen at the CPE side. In another embodiment, for example the transmitted probing signal could be transmitted on the upstream frequencies in the downstream direction. Therefore, the probing signal will not interfere with the downstream transmission, because the frequencies in the upstream and downstream bands do not overlap. Such transmission could happen at the CO side.

The probing signal could be transmitted during the data transmission period or during the Sync Symbol period. The Sync Symbol period is when the Sync Symbols are transmitted. Sync Symbols are transmitted to provide synchronization support to the DSL communications.

In one embodiment of the present invention, the probing signal's power is kept at a low Signal-to-Noise Ratio (SNR) level, in order to minimize the interference between the probing signal and the DSL signal itself, whether during the Sync Symbol or data transmission periods. The probing signal power level could be set as low as or smaller than noise power, resulting in a probing signal with negative SNR. Therefore the probing signal would be constituted as noise by the signal receiver.

In another embodiment, the probe signal power can be larger than noise power. The positive SNR could be utilized to recover the Probe signal in the presence of residual noise after cancellation. Moreover, the Data or synch symbol signal to noise ratio is large enough such that the probe signal would not interfere with proper decoding and reception of the Sync symbol or Data symbols. An example would be a Data or Sync Symbol SNR of 50 dB, with probe signal SNR of 10 dB. The Data or Sync symbol has a gain of 40 dB over the probe signal.

In one embodiment, the probing signal is recovered by cancelling the Sync symbol or Data symbols from the received signal. In this embodiment, first the Sync symbol or the data symbols are recovered. Then the estimated (recovered) Sync Symbol or data symbol are cancelled (removed) from the received signal. The Sync. symbol estimation is done via the techniques, methods and systems disclosed in PCT Patent application no. PCT/US2009/036076, filed Mar. 4, 2009, titled "DSL Noise Cancellation Using Sub-Optimal Noise Reference Signals." In case of cancelling data symbols, the estimated data would be provided by the DSL receiver at the DSL modem (i.e. DSL modems 102A-102C). In particular, when the testing device (i.e. 101B) and a DSL modem (i.e. 102B) are integrated, the estimated DSL data would be readily available by the DSL receiver. The recovered probing signal is further processed to obtain line characteristics information such as return loss and impedance.

In another embodiment the received probing signal is further processed to remove noise, either before the above cancellation step or afterwards. One technique for removing noise is averaging. For the averaging process, sufficient samples of the received signal are collected, and then the samples are averaged. The averaging process removes the noise from the received signal.

Figure 3:
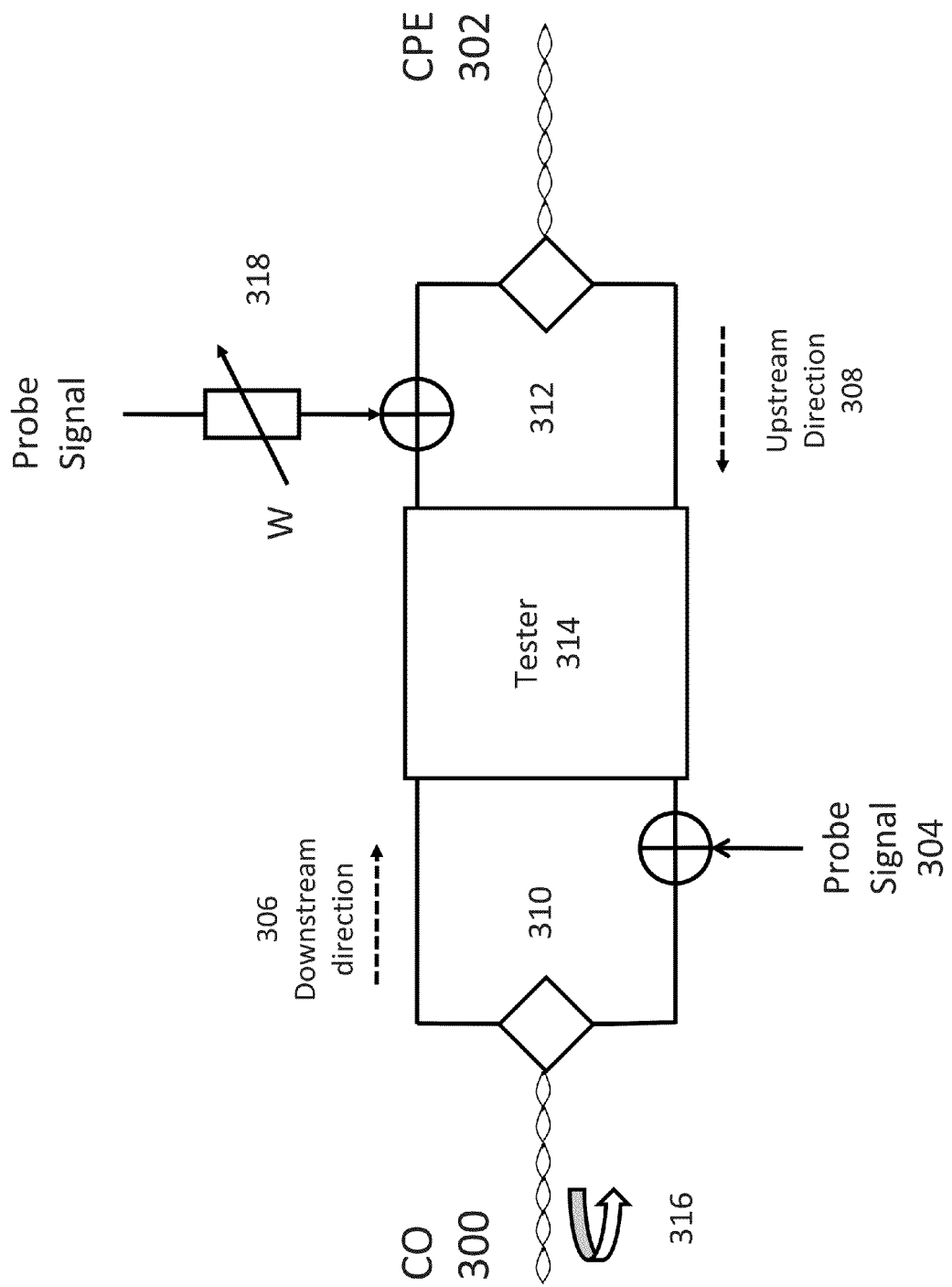
FIG. 3 is a schematic illustration of an example system diagram performing line testing.

FIG. 3 shows another embodiment of the present invention. In this embodiment the probing signal may have a positive SNR. Therefore the probing signal may be stronger than the received noise.

In order for the probing signal not to interfere with the DSL signal reception, the received probing signal is estimated using an adaptive filter and is cancelled out from the received signal. The estimation process also provides an estimate of the reflected probing signal that could be processed to obtain line characteristics information such as return loss and impedance.

In this embodiment, the probing signal is processed by an adaptive filter, and then cancelled from the received signal. The usage of the adaptive filter serves two objectives. One objective is to reproduce the reflected probing signal, which could be processed to obtain line characteristics information such as return loss and impedance. Alternatively, the coefficients of the adaptive filter could be used to obtain line characteristics. Another objective is to cancel out the reflected probing signal from the received signal, so that the receiver can process the received DSL signal, without any residue of the reflected probing signal, which might impair processing in the receiver. In this embodiment, the assumption is that reflected probing signal could have positive SNR, therefore the signal might have large enough magnitude, which might impair the received signal processing.

The first objective is performed by the usage of an adaptive filter. The transmitted probe signal is used to drive the adaptive filter training, and the received signal is used to form the error signal for correcting the filter adaptation. A number of adaptive filters, such as LMS, RLS, and variations of those could be used.

Once the adaptive filter coefficients have converged, and the training is complete, the adaptive filter canceller will be able to cancel out the reflected probing signal from the received signal, achieving the second objective. Furthermore, the coefficients of the adaptive filter would represent the probing signal reflection channel. This is because the input to the adaptive filter is the transmitted probing signal and the output of the adaptive filter is the received reflected probing signal. Therefore, the adaptive filter coefficients will represent the probing signal reflection channel. Hence, the line characteristics, such as return loss are readily obtained by knowing the coefficients of the adaptive filter representing the reflection channel.

DETAILED DESCRIPTION OF THE INVENTION

Figure 1A:
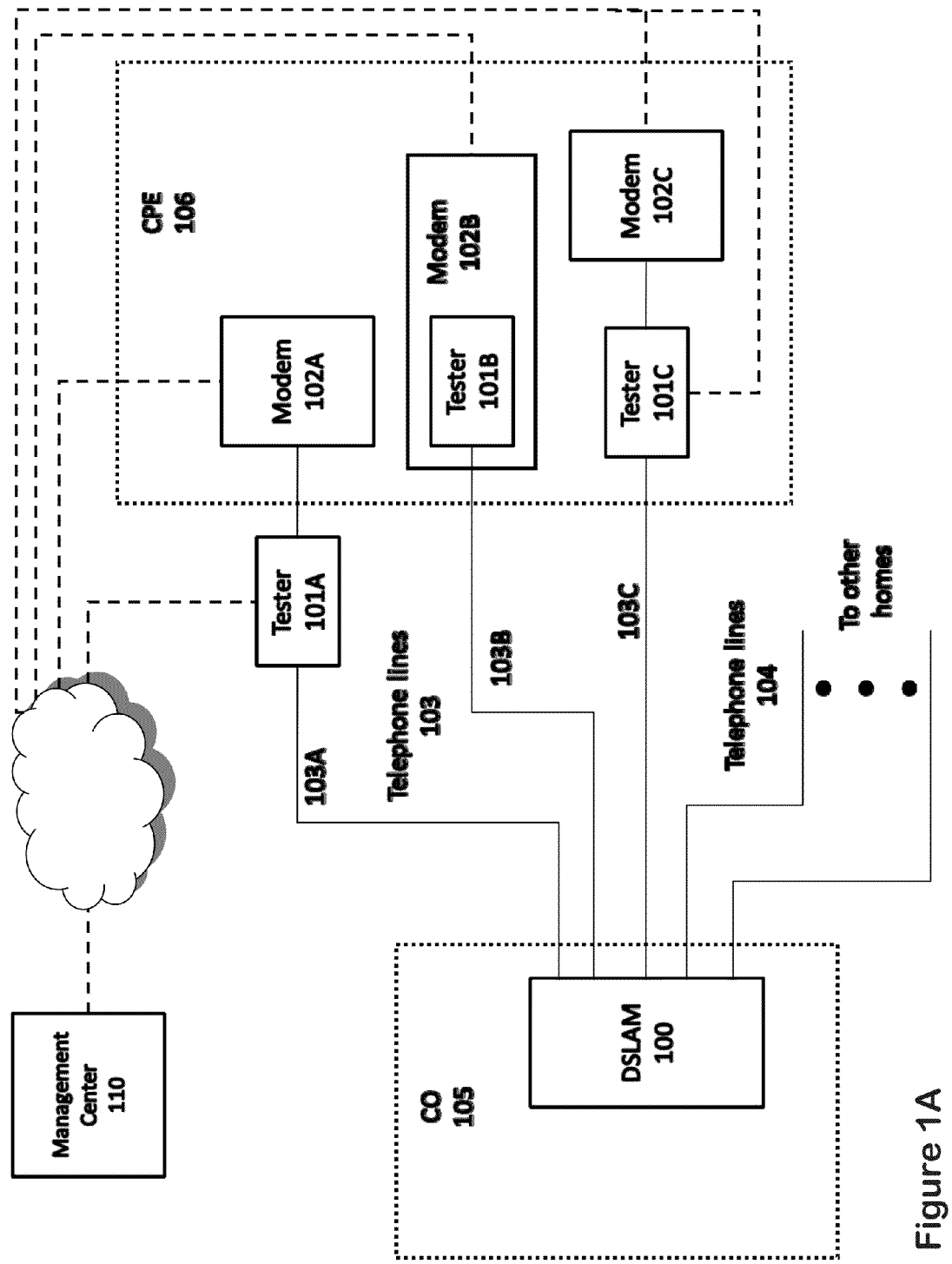
FIG. 1A is a schematic illustration of an example system diagram.

FIG. 1A illustrates a DSL network involving one embodiment of the invention. A bank of DSL modems, referred to as a DSLAM, (100) is typically located within a Central Office (105). Additionally, receiving DSL modems are each located at a Customer Premise (106). Telephone lines (103) carry the DSL signals from the DSLAM to the modems. Lines (103) may optionally provide voice band telephone signaling as well. Telephone lines 103 each typically comprises a twisted wire pair. Additional telephone lines (104) provide DSL communication to other customers.

Tester device (101B, 101C) represents one embodiment of the invention that is located within the customer premises. Tester devices (101A-C) perform line testing on the line (103), without disrupting the operation of DSL modems (102A-C). Other embodiments of the invention include integration of Tester device (101B) into a modem (102B), or integration into devices located outside of the customer premise (101A). The tester (101A, 101B, 101C), causes the transmission of a probing signal into at least one telephone line 103. The tester computes a parameter that represents a characteristic of the at least one telephone line 103 based upon at least a measured reflection of the probing signal.

FIG. 1A illustrates an example DSL system that measures, computes and/or otherwise determines any number and/or any of a variety of parameter(s) that characterize, describe and/or indicate the state of ordinary twisted-pair copper telephone line(s) that are being used and/or may be attempted to be used to provide DSL service(s) to the customer(s). Three such telephone lines are shown in FIG. 1A with reference numerals 103A, 103B, and 103C. In the example system of FIG. 1A, the characterizing parameter(s) are measured, computed and/or otherwise determined based upon one or more signals optionally transmitted from the customer premises 106 and/or one or more signals received and/or measured at the customer premises 106. However, a DSLAM 100 may or may not terminate the telephone lines 103A-C at other ends of the connections. Example characterizing parameters include, but are not limited to loop length, segment length(s), cable gauge(s), bridged-tap presence, bridged-tap location(s), bridged-tap length(s), bridged-tap gauge(s), open faults, short faults, cross faults, bad splice/connection, noise, excessive noise, data rate, signal-to-noise ratio(s), loop impedance, loop make-up, and/or loop attenuation/return loss. Alternatively or additionally, raw data collected by receiving and/or measuring signal(s) from a telephone line 103A-C may be instead forwarded to a geographically separate device to compute these or other parameters (110). Such raw data may include digitized responses to pulse(s) launched by a line tester device 101A-C into the telephone line 103A-C, measurements of noise with no signals launched, and/or direct impedance measurements. As discussed below, the determination and/or computation of the characterizing parameter(s) based on the signals received and/or measured at the customer premises 106 may be implemented at the customer premises 106 and/or at a geographically separate device (110).

To provide DSL services to the customer(s) via the example telephone lines 103A-C, the example system of FIG. 1A includes any variety of DSLAM 100. The example DSLAM 100 of FIG. 1A implements, among other things, any of a variety and/or number of DSL modems (not shown). The DSLAM 100 may be located in a central office (CO) and/or a remote terminal (RT). Persons of ordinary skill in the art will appreciate that, like other components described in the examples described herein, the DSLAM 100 need not be present.

To monitor, measure and/or record current and/or historical DSL performance characteristics for DSL communications occurring between the example DSLAM 100 and a plurality of subscriber DSL modems (three of which are shown with reference numerals 101A, 101B and 101C), the example DSL system of FIG. 1A includes a Management Center 110. The Management Center 110 may be part of, implemented by and/or performed by any or all of the following: a Spectrum Management Center (SMC), a Dynamic Spectrum Management Center (DSM Center), a DSL Optimizer (DSLO), a DSL Management center, a DSL Operations Center, an Operations Support System (OSS), an Element Management System (EMS), a Network Management System (NMS), other transmission or management network elements, and/or the example DSLAM 100. As described below, the DSL example Management Center 110 may request, receive, compute and/or otherwise obtain any number and/or any of a variety of parameters that characterize the telephone line(s) and that are used to provide and/or may potentially be used to provide DSL services (e.g., the example telephone lines 103A-C). In the illustrated example, the telephone-line-characterizing parameter(s) and/or the performance characteristic(s) are stored in the example Management Center 110 using any of a variety of data structure(s), data table(s), data array(s), etc. Using any of a variety of method(s), technique(s) and/or algorithm(s), a service provider or a third party, may use the telephone-line-characterizing parameter(s) and/or the performance characteristic(s), for example, to offer, sell and/or provision new DSL services, and/or to maintain, monitor and/or diagnose existing DSL services.

To measure signals from which the telephone-line-characterizing parameter(s) may be determined, the example system of FIG. 1A includes testers, which could be testers, at customer premises 106. Three example testers 101A, 101B, and 101C are shown in FIG. 1A. The example testers 101A-C of FIG. 1A transmit any of a variety of line probing signals and/or receive and/or measure any of a variety of reflected line probing signals, crosstalk line probing signals and/or noise signals. Example probing signals include pulse and/or step time domain reflectometry (TDR) signals, spread spectrum signals, nominal modem transmission signals (e.g., a multi-carrier signal of an ADSL modem), chirp signals, impulse trains, single impulse, etc. To measure noise conditions, a line probing signal may be a zero-voltage, quiet, null and/or all zeros signal such that, effectively, no signal is transmitted into a telephone line being tested and/or characterized.

An example implementation of the example testers is discussed in PCT Patent application no. PCT/US2009/036076, filed Mar. 4, 2009, titled "DSL Noise Cancellation Using Sub-Optimal Noise Reference Signals" and U.S. patent application Ser. No. 12/226,939, filed Apr. 27, 2007, titled "Methods and Apparatus to Perform Line Testing at Customer Premises."

Using any of a variety of method(s), technique(s) and/or algorithm(s), the example testers 101A-C estimate, determine and/or compute the characterizing parameter(s) from the received and/or measured signals. For example, with knowledge of what probing signal was transmitted, and given a received and/or measured reflected signal, a tester can, for example, compute an echo path response, detect the presence of a bridged tap, characterize a detected bridged tap, estimate a loop attenuation, etc. In some circumstances, the measured reflected signals at the customer end of a telephone line will include a much greater level of detail about a customer premises environment and/or the telephone line than would be available from reflected signals at the other (e.g., CO or RT) end. Therefore, the illustrated example seeks to obtain this enhanced level of detail by performing one or more line test(s) from the customer premises 106.

The example testers 101A-C of FIG. 1A may be implemented by any of a variety of computing devices such as, for example, a) a subscriber's PC, b) stand alone tester, and/or c) a DSL modem or d) a subscriber's set-top box. For example, a PC implementing a tester 101B may be connected to an Internet network and/or service via, for example, the DSL modem 102B. In such an example, the PC/tester 101B is used to receive and/or utilize, for example, Internet, audio, video, email, messaging, television, and/or data services via the subscriber's DSL service. In such an example, the PC 101B is connected to the Internet via the DSL modem 102B, the telephone line 103B and the DSLAM 100. Accordion to one embodiment, the DSL modem 102B may be communicatively coupled to the example PC 101B and/or be implemented by and/or within the example PC 1018.

The example testers 101A-C of FIG. 1A may execute machine accessible instructions to determine and/or compute the telephone-line-characterizing parameter(s) from signal(s) received and/or measured by the corresponding example testers 101A-C. In the example system of FIG. 1A, such machine accessible instructions may be (a) loaded into a tester via a compact disc (CD) or other non-volatile storage (e.g., a digital versatile disc (DVD)) mailed and/or provided by, for example, a service provider; (b) downloaded to the tester 101A, 1018, and 101C from an Internet site (e.g., a download server that provides machine accessible instructions provided by the Management Center 110), and/or (c) loaded into the tester by, for example, the Management Center 110. Any of a variety of network protocols such as, for example, hypertext transfer protocol (HTTP), file transfer protocol (FTP), and/or email protocols (e.g. SMTP) may be used to transfer the machine accessible instructions to the tester 101A, 1018, and 101C.

The characterizing parameter(s) determined and/or computed by the example testers 101A-C are stored by and/or within the testers 101A-C using any of a variety of data structure(s), machine accessible file(s), and/or memory(ies). The example testers 101A-C of FIG. 1A provide the determined and/or computed characterizing parameter(s) to the Management Center 110 via any of a variety of method(s), network(s) and/or protocol(s). For example, if there is a DSL connection available and/or operable between the DSL modems 102A-C and the DSLAM 100, the example testers 101A-C can provide the characterizing parameter(s) via the DSL service using, for example, the exchange protocol defined in the ITU G.994.1 (a.k.a. G.hs) standard. Additionally or alternatively, the characterizing parameter(s) may be sent and/or provided to the Management Center 110 via the Internet and/or a PSTN using, for example, a dial-up and/or voice-band modem communicatively coupled to, and/or implemented by and/or within the tester 101A-C. Such a dial-up or voice-band modem could operate over the voice band on the same loop as the DSL service, or it could operate over a separate loop supporting POTS service. A tester may, additionally or alternatively, provide the characterizing parameter(s) to the Management Center 110 via any of a variety of intermediary service(s) such as, for example, an Auto-Configuration Server (ACS) as defined in the DSL Forum document TR-069. In the example of FIG. 1A, if a tester 101A, 101B, and/or 101C is not currently communicatively coupled and/or couple-able to the example Management Center 110, the characterizing parameter(s) may be sent and/or provided via any of a variety of additional and/or alternative methods such as, for example, storing the characterizing parameter(s) on a CD or other non-volatile storage medium (e.g., a DVD) that can be sent and/or delivered to a service provider and then loaded into the Management Center 110. Additionally or alternatively, a tester 101A, 101B, and/or 101C can display the parameter(s) in, for example, the form of a condensed ASCII code using any of a variety of graphical user interfaces (GUIs) displayed for and/or presented to a person. The example person can in turn provide the parameter(s) to a technician and/or customer service representative who in turn loads the provided parameter(s) into the Management Center 110. The person may be, for example, a subscriber or technician.

As illustrated in FIG. 1A, the testers 101A-C may be implemented using any of a variety of combinations. For example, the example tester 101B is implemented by and/or within any of a variety of DSL modem(s) 102B, the example tester 101A is implemented as any of a variety of stand-alone devices such as external to the CPE 106, the example tester 101C is implemented by and/or within the example CPE 106 but separate from the modem 102C. Also, a single prober could be implemented by and/or within multiple DSL modems present at the customer premises 106. Persons of ordinary skill in the art will readily appreciate that there are a multitude of other ways of implementing testers. For example, a tester may be implemented by any of variety of residential gateways or STBs.

The example testers 101A and 101C may be communicatively coupled to their respective Modems 101A and 101C via any of a variety of communication buses, backplanes, wired and/or wireless signals and/or technologies such as, a universal serial bus (USB), and/or a wired and/or wireless connection in accordance with the Institute of Electrical and Electronics Engineers (IEEE) 802.3x and/or 802.11x standards. Additionally, a tester 101B may be implemented by and/or within a DSL modem tester 102B, using, for example, a peripheral component interface (PCI) card.

In the example system of FIG. 1A, determination and/or computation of the parameter(s) that characterize a telephone line may be initiated, requested and/or provided in any of a variety of ways. For example, the example Management Center 110 may send a request and/or command to a tester 101A, 101B, and/or 101C requesting the transmission of probing signals and/or requests reception and/or measurement of signals from the tester 101A, 101B, and/or 101C. The tester 101A, 101B, and/or 101C may additionally compute and/or determine the characterizing parameter(s) from the received and/or measured signals, and then return the same to the Management Center 110 as discussed above. Additionally or alternatively, a DSL subscriber, technician, installer, etc. may initiate the process of transmitting probing signals, signal measurement, and/or characterizing parameter computation and/or determination via any of a variety of GUIs provided and/or displayed by a tester 101A, 101B, and/or 101C. Finally, the transmission of probing signals may be initiated by a DSL modem operating in loop diagnostic mode. The tester itself may make regular or periodic attempts to identify itself to a service provider maintenance device or to a management center through any of the above-mentioned electronic communication paths. Thus, its release of data need not necessarily be prompted by a service provider.

In the illustrated example of FIG. 1A, example testers 101A, 101B, and/or 101C implemented external to, or by and/or within a DSL modem, residential gateway, etc. have access to alternating current (AC) and/or battery power, even if the DSL modem or residential gateway is in a low power state and/or is turned off. This allows a communicatively coupled tester 101A, 101B, and/or 101C to perform line testing, probing and/or signal measuring independent of the state of the DSL modem or residential gateway. Thus, line testing, probing and/or characterizing can be performed by technicians, maintenance personal and/or customer service representatives even if the DSL modem or residential gateway is turned off. In such circumstances, the sending of request(s) to the tester occurs via another existing and/or available connection between the tester 101A, 101B, and/or 101C and the Internet and/or the PSTN, and/or via a user operating, for example, a GUI displayed and/or provided by the tester 101A, 101B, and/or 101C.

Figure 1B:
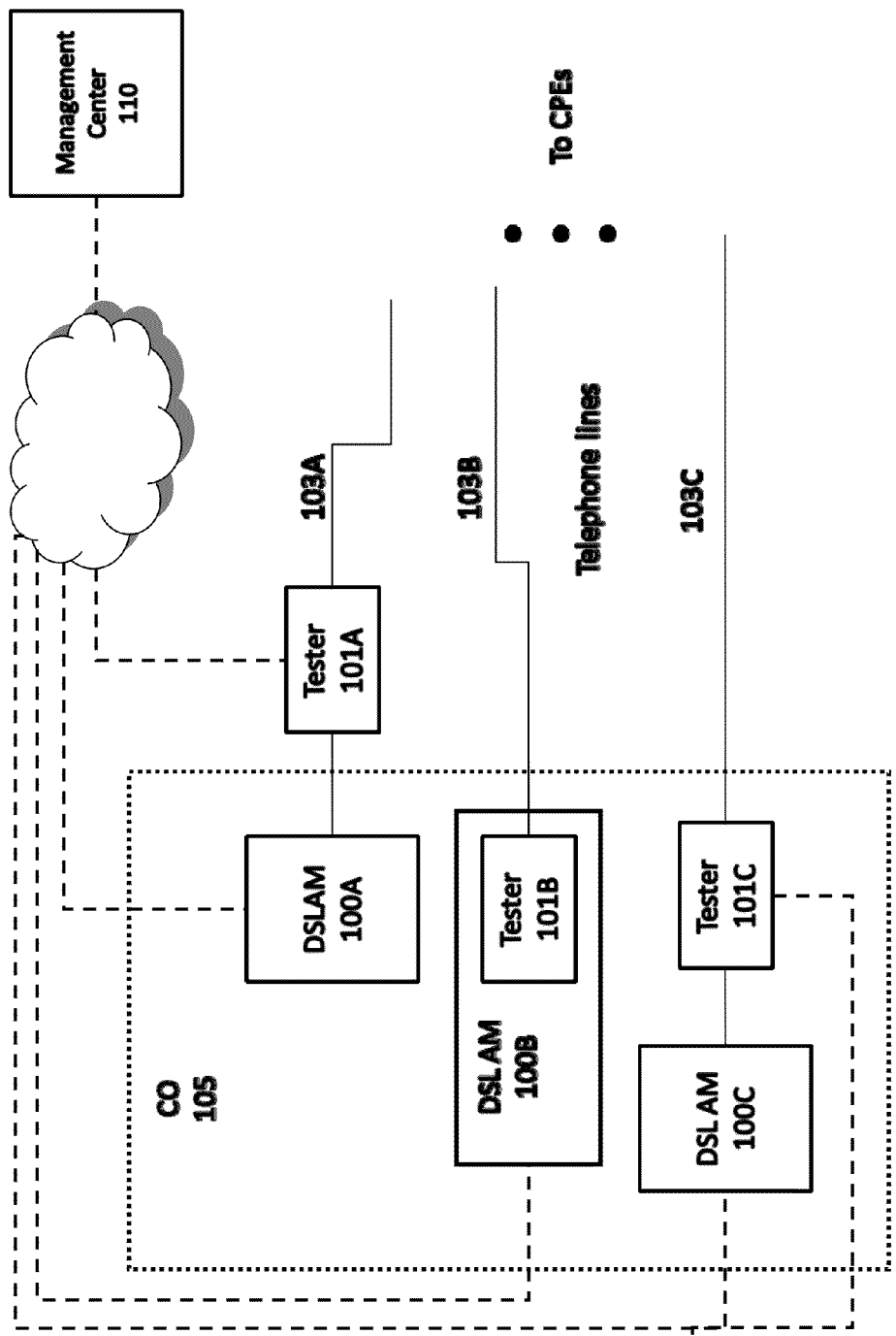
FIG. 1B is a schematic illustration of an example system diagram.

While in the example of FIG. 1A, the example testers 101A-C are located at or near the customer premises 106, persons of ordinary skill in the art will readily appreciate that, additionally or alternatively, testers 101A, 101B, and/or 101C may be implemented at a CO or RT, as shown in FIG. 1B. For example, a tester 101A, 101B, and/or 101C could be implemented by and/or within the example DSLAM 100. As shown in FIG. 1B, in one example, the tester (e.g., tester 101A, 101B, and/or 101C) provides received and/or measured probing and/or noise signals to the remotely located Management Center 110. Further, while FIG. 1A illustrates one tester 101A-C for each line or loop (103), persons of ordinary skill in the art will readily appreciate that a tester that is, for example, located at a CO may determine and/or compute characterizing parameter(s) for more than one telephone line using received and/or measured signals from more than one tester 101A-C located at CO 105. Further still, one or more testers may be implemented by (101C), within (101B) and/or in conjunction (101A) with a DSLAM to provide line testing, probing and/or characterizing from the service provider's end of a telephone line.

In the illustrated example of FIGS. 1 and 1B, the example Management Center 110 can also use the set of testers 101A-C to measure and/or characterize near-end and/or far-end cross-talk. For example, a first tester at a first customer premises 106 (e.g., the example tester 101A-C) can be configured to transmit a probing signal into a first telephone line (e.g., the telephone line 103A) while, at substantially the same time, a second tester at a second customer premises 106 (e.g., the example tester 101B) suspends transmission of the line probing signal, transmits a "quiet" signal, or no signal into a second telephone line (e.g., the telephone line 103B). A signal then received and measured by the second tester 101B can be used to characterize so called "near-end crosstalk" from the first telephone line 103A associated with the first tester 101A into the second telephone line 103B associated with the second tester 101B. If the second tester 101B is instead located at the CO end 105 of the second telephone line 103B, then the signal received and measured by the second tester 101B can be used to characterize so called "far-end crosstalk" from the first telephone line 103A into the second telephone line 103B. The second tester 101B of the illustrated example need not send signals into the line to measure signals from the line. Instead, the illustrated example second tester 101B may collect and save samples from the line 103B at regular and/or irregular intervals to assess noise at the customer premises 106 and/or CO 105. Such samples can be stored in the second tester 101B and then be provided when the second tester 101B is interrogated by the tester 101B, forwarded at scheduled times, forwarded upon the occurrence of predetermined events (e.g. storage of a predetermined amount of data), and/or at other periodic and/or aperiodic times.

FIG. 2 shows one embodiment of the present invention where a probing signal (204) is sent on the DSL line from the line test device (214), and the reflected signal (216) is received by the line test device (214). The hybrids (210) and (212) connect the test device to the CO (200) and CPE (202) sides respectively.

In DSL standards that employ frequency-division duplexing (FDD) of upstream and downstream data transmission, the transmitted probing signal (204) could be transmitted on the frequencies used for downstream transmission or on the frequencies used for upstream data transmission. The transmitted probing signal (204) could also be transmitted in the upstream direction (208) or in downstream direction (206), i.e. either at the CPE side or the CO side. In FIG. 2, the example embodiment shows the probe signal being transmitted in the upstream direction (at the CPE side). In this example the transmitted probing signal is transmitted on the frequencies used for downstream data transmission by the DSL link. Therefore, the probing signal will not interfere with the upstream transmission, because the frequencies in the upstream and downstream bands do not overlap. However, such a probing signal might have the potential to interfere with downstream transmission because it occurs in the same frequency bands used by the DSL modem for downstream data transmission. This phenomenon is referred to as "in-band interference". In another embodiment, the transmitted probing signal could be transmitted on the upstream frequencies in the downstream direction (at the CO side). Therefore, the probing signal will not interfere with the downstream transmission, because the frequencies in the upstream and downstream bands do not overlap. However, such a probing signal has the potential to interfere with upstream transmission because it occurs in the same frequency bands as used by the DSL modem for upstream data transmission. This phenomenon is also referred to as "in-band interference".

Furthermore, the probing signal could be transmitted during the data transmission period or during a Sync Symbol period. A Sync Symbol period is the duration of time during which a Sync Symbol is transmitted by a DSL modem. One of the Sync Symbol transmission periods may be during the modem initialization period. Additionally, Sync Symbols may be transmitted to provide synchronization support to the DSL communications during normal modem operation (SHOWTIME).

Figure 4:
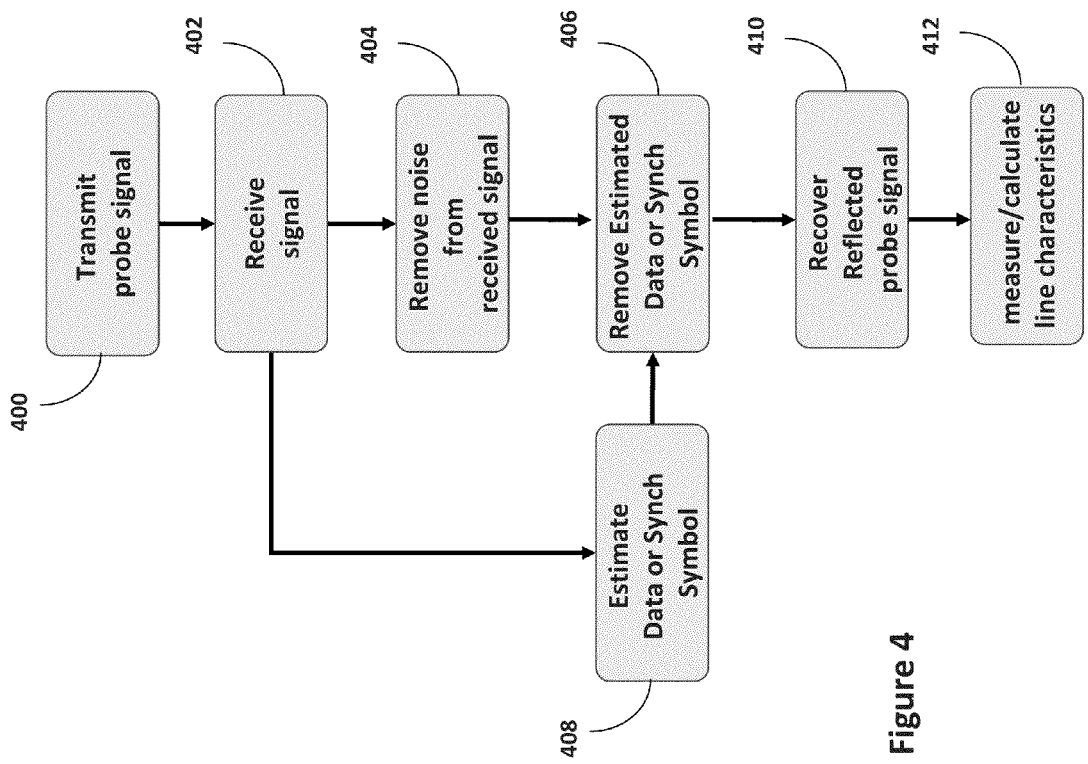
FIG. 4 is a schematic illustration of an example method to perform line testing.

In one embodiment of the present invention, the probing signal's power is kept at a low SNR level, in order to minimize the interference between the probing signal and the DSL signal itself, whether during the Sync Symbol or data transmission periods. The probing signal power level could be set as low as or smaller than noise power, resulting in a probing signal with negative SNR. Therefore the probing signal would be constituted as noise by the signal receiver. FIG. 4 shows one embodiment of the present invention where the probing signal is recovered by cancelling the Sync symbol or Data symbols from the received signal. In this embodiment, first the probe signal is transmitted on the line, step (400). The received signal is then received (step 402) by the test device (214).

The received signal can be represented as the following:

$$y(k) = \text{Sync}(k) + N(k) + R_{probe}(k);$$

when test probe signal is sent during Sync symbol $$y(k) = \text{Data}(k) + N(k) + R_{probe}(k);$$

when test probe signal is sent during data symbol where $$R_{probe}(k) = \text{reflection\_channel}(k) * T_{probe}(k)$$

where $y(k)$ represents the received signal at time sample k, Sync(k) represents the received Sync. symbol at time sample k, Data(k) represents the received data symbol at time sample k, N(k) represents the noise sample at time sample k, $R_{probe}(k)$ represents the reflected probe signal at time sample k, $T_{robe}(k)$ represents the transmitted probe signal at time sample k, and Reflection_Channel(k) represents the impulse response of the reflected channel, and * represents the convolution function.

The goal is to recover the $R_{probe}(k)$ signal, which could be processed to obtain line characteristics information such as return loss and impedance.

In one embodiment of the present invention, the noise is removed from the received signal y(k) before removing the Sync. or Data symbols, step (404). In the case of removing only the Sync symbol, the probe signal is transmitted during the sync period. And in the case of removing the Data symbol, the probe signal is transmitted during the data period. One method for removing noise is averaging. For the averaging process, sufficient samples of the received signal are collected, and then the samples are averaged. The averaging process removes the noise from the received signal. The Sync. or the Data signal is then cancelled by subtracting an estimate of the Sync symbol or the Data signal from the noise-removed y(k), step (406). The Sync symbol or the Data symbols are estimated independently, step (408). Then the estimated (recovered) Sync Symbol or Data symbol are cancelled (removed) from the received signal, step 406. The Sync. symbol estimation is done via the techniques, methods and systems disclosed in PCT Patent application no. PCT/US2009/036076, filed Mar. 4, 2009, titled "DSL Noise Cancellation Using Sub-Optimal Noise Reference Signals." In case of cancelling data symbols, the estimated data would be provided by the DSL receiver at the DSL modem (such as DSL modems 102A-102C). In particular, when the testing device (i.e. 101B) and a DSL modem (i.e. 102B) are integrated, the estimated DSL data would be readily available by the DSL receiver. The recovered probing signal is further processed to obtain line characteristics information such as return loss and impedance (412).

The process could be described as following for when test probe signal is sent during Data symbol:

Receiving y(k):

$$y(k) = \text{Data}(k) + N(k) + R_{probe}(k)$$

Remove noise:

$$\text{remove\_noise}(y(k)) = \text{Data}(k) + R_{probe}(k)$$

Estimate Data(k)

$$\text{estimated\_Data}(k) = \text{estimate}(D(k))$$

Cancelling/removing Data(k):

$$\text{remove\_noise}(y(k)) - \text{estimated\_Data}(k) = R_{probe}(k)$$

The process could be described as following for when test probe signal is sent during Sync. symbol:

Receiving y(k):

$y(k) = \text{Sync}(k) + N(k) + R_{probe}(k)$

Removing noise from y(k):

$\text{remove\_noise}(y(k)) = \text{Sync}(k) + R_{probe}(k)$

Estimate Sync(k)

$\text{estimated\_Sync}(k) = \text{estimate}(\text{Sync}(k))$

Cancelling/removing Sync(k):

$\text{remove\_noise}(y(k)) - \text{estimated\_Sync}(k) = R_{probe}(k)$

The recovered received probe signal $R_{probe}(k)$ is then analyzed to measure and calculate the line characteristics information, such as return loss and impedance.

FIG. 3 shows another embodiment of the present invention. However, in this embodiment, the probing signal may have a positive SNR. The signal may be stronger than the received noise. In order to avoid having the positive SNR probing signal create "in-band interference", the reflected probing signal is estimated using an adaptive filter (318), with coefficients (W) representing the reflection channel, and the reflected probing signal is removed from the received signal (306) before being passed to the hybrid (312). The coefficients (W) may be processed to obtain line characteristics information such as return loss and impedance.

The probing signal (304) is sent on the DSL line from the line test device (314), and the reflected signal (316) is received by the line test device (314). The hybrids (310) and (312) connect the test device to the CO (300) and CPE (302) sides respectively.

The transmitted probing signal (304) could be transmitted on the downstream frequencies or on the upstream frequencies. The transmitted probing signal (304) could also be transmitted in the upstream direction (308) or in downstream direction (306). In FIG. 3, the example embodiment shows the probe signal being transmitted in the upstream direction. In this example the transmitted probing signal is transmitted on the downstream frequencies in the upstream direction. Therefore, the probing signal will not interfere with the upstream transmission, because the frequencies in the upstream and downstream bands do not overlap. Such transmission could happen at the CPE side. In another embodiment, the transmitted probing signal could be transmitted on the upstream frequencies in the downstream direction. Therefore, the probing signal will not interfere with the downstream transmission, because the frequencies in the upstream and downstream bands do not overlap. Such transmission could happen at the CO side. In another embodiment, the probing signal is transmitted during the Sync Symbol period or the Data period. In this embodiment, the probing signal is recovered by an adaptive filter (318), with coefficients (W) representing the reflection channel, and then cancelled from the received signal.

Figure 5:
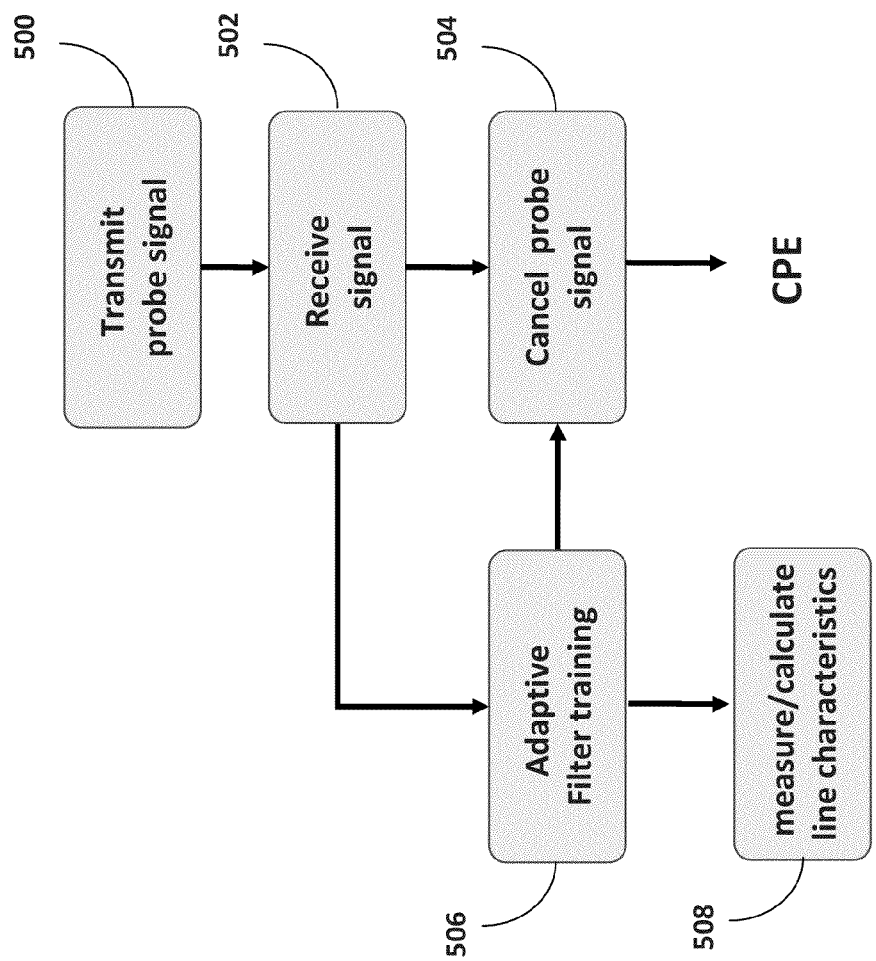
FIG. 5 is a schematic illustration of an example method to perform line testing.

FIG. 5, shows a functional diagram of the above embodiment. In this embodiment, first the probe signal is transmitted on the line, step (500). The received signal is then received (step 502) by the test device (214).

The received signal can be represented as the following:

$y(k) = \text{Sync}(k) + N(k) + R_{probe}(k);$ when test probe signal is sent during Sync symbol, or $y(k) = \text{Data}(k) + N(k) + R_{probe}(k);$ when test probe signal is sent during Data symbol where $R_{probe}(k) = \text{reflection\_channel}(k) * T_{probe}(k)$ where y(k) represents the received signal at time sample k, Sync(k) represents the received Sync symbol at time sample k, Data(k) represents the received Data symbol at time sample k, N(k) represents the noise sample at time sample k, $R_{probe}(k)$ represents the reflected probe signal at time sample k, $T_{probe}(k)$ represents the transmitted probe signal at time sample k, and Reflection_Channel(k) represents the impulse response of the reflected channel, and * represents the convolution function.

The usage of the adaptive filter serves two objectives. One objective is to recover the $R_{probe}(k)$ signal, which could be processed to obtain line characteristics information such as return loss and impedance. Another objective is to cancel out $R_{probe}(k)$ from the received signal, so that the DSL receiver at the DSL modem (i.e. DSL modems 102A-102B) can process y(k), without any residue $R_{probe}(k)$ which might impair the Sync. symbol or Data symbol processing in the receiver. In this embodiment, the assumption is that $R_{probe}(k)$ could have positive SNR, therefore the signal might have large enough magnitude, which might impair the received signal processing, during the synch. symbol or Data symbol processing time.

Both objectives may be achieved by the usage of an adaptive filter (506). The inputs to the adaptive filtering algorithm are the transmitted probe signal (304) and the received signal (306). The adaptive filtering algorithm attempts to find filter coefficients to remove the transmitted probe signal (304) from the received signal (306). The adaptive filtering algorithm used could be least mean-squares (LMS), regularized least mean-squares (RLS), time-domain processing, frequency-domain processing, or other such adaptive filtering algorithms as would be known to those proficient in the art.

As the adaptive filter coefficients converge, the adaptive filter canceller will be able to remove the reflected probing signal from the received downstream signal (504) with increasing efficacy such that the effect of any "in-band interference" is transient. Furthermore, the coefficients of the adaptive filter may themselves contain information that may be used to estimate the probing signal reflection channel (508). This is because the input to the adaptive filter is the transmitted probing signal and the output of the adaptive filter is the received reflected probing signal. Therefore, the adaptive filter coefficients will represent the probing signal reflection channel.

Line characteristics, such as return loss and impedance, may be estimated from the coefficients of the adaptive filter representing the reflection channel using algorithms and techniques including but not limited to: matching the observed reflection channel to models of reflection channels of measured or modeled loop configurations, matching the observed reflection channel to historical statistics computed from the reflection channel of the same or neighboring lines, comparing the observed reflection channel to the reflection channel when other line terminations, impairments, or alterations are present on the same line, and using Bayesian inference to combine reflection channel data with historical reflection channel data or other data sources. Such analyses may be conducted at the Tester (101A/B/C) or at the Management Center (110), or by a combination of actions at each device. The results of such analyses may be stored, transferred, or exported by or to the Management Center (110).

One embodiment of the above process could be further described as following. The received signal y(k) is utilized to train the adaptive filter (506). The output of the adaptive filter is the estimated reflected probing signal. The reflected probing signal is then cancelled by subtracting the estimate of the reflected probing from the received signal y(k) (504).

Receiving y(k):

$$y(k)=\text{Sync}(k)+N(k)+R_{probe}(k);$$

when test probe signal is sent during Sync symbol or $$y(k)=\text{Data}(k)+N(k)+R_{probe}(k);$$

when test probe signal is sent during Data symbol-Adaptive filtering of y(k):

$$R_{probe}(k)=\text{adaptive\_filter}(y(k),T_{probe}(k))$$

Cancelling/removing $R_{probe}(k)$:

$$y(k)-R_{probe}(k)=\text{Sync}(k)+N(k)$$

Figure 6:
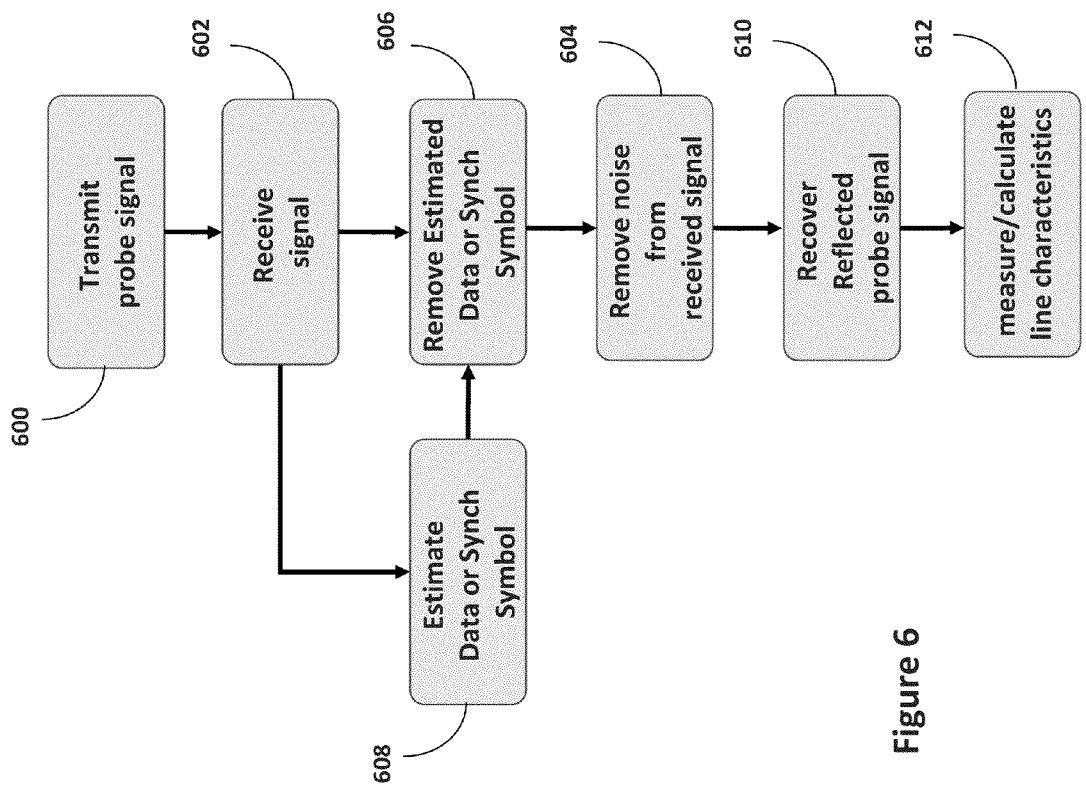
FIG. 6 is a schematic illustration of an example method to perform line testing.

In another embodiment of the above process, the adaptive filtering can be done during both Sync Symbol period and Data Symbol period. The initial adaptation can start during the Sync Symbol period, when decoding is less sensitive to the input SNR of the adaptive filter, and further adaptation could be continued during Data Symbol period. FIG. 6 shows another embodiment of the present invention that utilizes the technique of recovering the probe signal by cancelling the Sync symbol or Data symbols from the received signal. In this embodiment, first the probe signal is transmitted on the line, step (600). The received signal is then received (step 602) by the test device (214).

The received signal can be represented as the following:

$$y(k)=\text{Sync}(k)+N(k)+R_{probe}(k);$$

when test probe signal is sent during Sync symbol $$y(k)=\text{Data}(k)+N(k)+R_{probe}(k);$$

when test probe signal is sent during data symbol where $$R_{probe}(k)=\text{reflection\_channel}(k)*T_{probe}(k)$$

where y(k) represents the received signal at time sample k, Sync(k) represents the received Sync symbol at time sample k, Data(k) represents the received data symbol at time sample k, N(k) represents the noise sample at time sample k, $R_{probe}$(k) represents the reflected probe signal at time sample k, $T_{probe}$(k) represents the transmitted probe signal at time sample k, and Reflection_Channel(k) represents the impulse response of the reflected channel, and * represents the convolution function.

The goal is to recover the $R_{probe}$(k) signal, which could be processed to obtain line characteristics information such as return loss and impedance.

In this embodiment, the noise is removed from the received signal y(k) after removing the Sync. or Data symbols, step (604).

The Sync. or the Data signal is cancelled by subtracting an estimate of the Sync symbol or the Data signal from the received signal y(k), step (606). The Sync symbol or the Data symbols are estimated independently, step (608). Then the estimated (recovered) Sync Symbol or Data symbol are cancelled (removed) from the received signal, step (606). The Sync. symbol estimation is done via the techniques, methods and systems disclosed in PCT Patent application no. PCT/US2009/036076, filed Mar. 4, 2009, titled "DSL Noise Cancellation Using Sub-Optimal Noise Reference Signals." In case of cancelling data symbols, the estimated data would be provided by the DSL receiver at the DSL modem (i.e. DSL modems 102A-102C). In particular, when the testing device (i.e. 101B) and a DSL modem (i.e. 102B) are integrated, the estimated DSL data would be readily available by the DSL receiver. The recovered probing signal is further processed to obtain line characteristics information such as return loss and impedance.

The next step involves removing noise (604). One method for removing noise is averaging. For the averaging process, sufficient samples of the received signal are collected, and then the samples are averaged. The averaging process removes the noise from the received signal.

The process could be described as following for when test probe signal is sent during Data symbol:

Receiving y(k):

$$y(k)=\text{Data}(k)+N(k)+R_{probe}(k)$$

Estimated Data(k)

$$\text{estimated\_Data}(k)=\text{estimate}(\text{Data}(k))$$

Cancelling/removing Data(k):

$$y(k)-\text{estimated\_Data}(k)=N(k)+R_{probe}(k)$$

Remove noise:

$$\text{remove\_noise}[y(k)-\text{estimated\_Data}(k)]=R_{probe}(k)$$

The process could be described as following for when test probe signal is sent during Sync. symbol:

Receiving y(k):

$$y(k)=\text{Sync}(k)+N(k)+R_{probe}(k)$$

Estimated Sync(k)

$$\text{estimated\_Sync}(k)=\text{estimate}(\text{Sync}(k))$$

Cancelling/removing Sync(k):

$$y(k)-\text{estimated\_Sync}(k)=R_{probe}(k)$$

Removing noise:

$$\text{remove\_noise}[y(k)-\text{estimated\_Sync}(k)]=R_{probe}(k)$$

The recovered received probe signal $R_{probe}$(k) is then analyzed to measure and calculate the line characteristics information, such as return loss and impedance.

Figure 7:
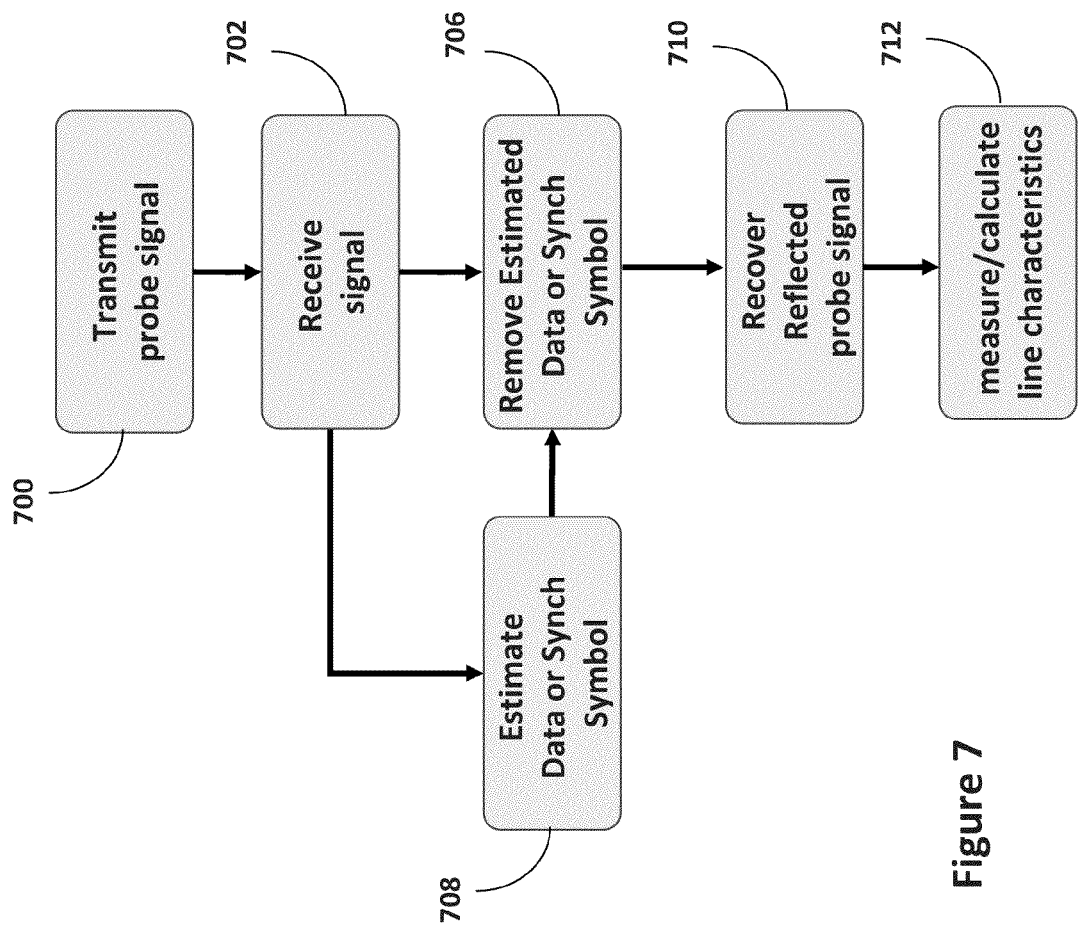
FIG. 7 is a schematic illustration of an example method to perform line testing.

FIG. 7 shows another embodiment of the present invention that utilizes the technique of recovering the probe signal by cancelling the Sync symbol or Data symbols from the received signal. In this embodiment, first the probe signal is transmitted on the line, step (700). The received signal is then received (step 702) by the test device (214).

The received signal can be represented as the following:

$$y(k)=\text{Sync}(k)+N(k)+R_{probe}(k);$$

when test probe signal is sent during Sync symbol $$y(k)=\text{Data}(k)+N(k)+R_{probe}(k);$$

when test probe signal is sent during data symbol where $$R_{probe}(k)=\text{reflection\_channel}(k)$$

where y(k) represents the received signal at time sample k, Sync(k) represents the received Sync symbol at time sample k, data(k) represents the received data symbol at time sample k, N(k) represents the noise sample at time sample k, $R_{probe}$(k) represents the reflected probe signal at time sample k, $T_{probe}$(k) represents the transmitted probe signal at time sample k, and Reflection_Channel(k) represents the impulse response of the reflected channel, and * represents the convolution function.

The goal is to recover the $R_{probe}$(k) signal, which could be processed to obtain line characteristics information such as return loss and impedance.

The Sync. or the Data signal is cancelled by subtracting an estimate of the Sync symbol or the Data signal from the received signal y(k), step (706). The Sync symbol or the Data symbols are estimated independently, step (708). Then the estimated (recovered) Sync Symbol or Data symbol are cancelled (removed) from the received signal, step (706). The Sync. symbol estimation is done via the techniques, methods and systems disclosed in PCT Patent application no. PCT/US2009/036076, filed Mar. 4, 2009, titled "DSL Noise Cancellation Using Sub-Optimal Noise Reference Signals." In case of cancelling data symbols, the estimated data would be provided by the DSL receiver at the DSL modem (i.e. DSL modems 102A-102C). In particular, when the testing device and a DSL modem are integrated, the estimated DSL data would be readily available by the DSL receiver. The recovered probing signal is further processed to obtain line characteristics information such as return loss and impedance.

The process could be described as following for when test probe signal is sent during Data symbol:

Receiving y(k):

$$y(k) = \text{Data}(k) + N(k) + R_{probe}(k)$$

Estimated Data(k)

$$\text{estimated\_Data}(k) = \text{estimate}(D(k))$$

Cancelling/removing Data(k):

$$y(k) - \text{estimated\_Data}(k) = N(k) + R_{probe}(k)$$

The process could be described as following for when test probe signal is sent during Sync. symbol:

Receiving y(k):

$$y(k) = \text{Sync}(k) + N(k) + R_{probe}(k)$$

Estimated Sync(k)

$$\text{estimated\_Sync}(k) = \text{estimate}(\text{Sync}(k))$$

Cancelling/removing Sync(k):

$$y(k) - \text{estimated\_Sync}(k) = N(k) + R_{probe}(k)$$

The recovered received probe signal $R_{probe}(k)$ is then analyzed to measure and calculate the line characteristics information, such as return loss and impedance. In this embodiment, the probe signal power can be larger than noise power. The positive SNR could be utilized to recover the Probe signal in the presence of residual noise after cancellation. Moreover, the Data or synch symbol signal to noise ratio is large enough such that the probe signal would not interfere with proper decoding and reception of the Sync symbol or Data symbols. An example would be a Data or Sync Symbol SNR of 50 dB, with probe signal SNR of 10 dB. The Data or Sync symbol has a gain of 40 dB over the probe signal.

The cancellation techniques discussed in the disclosed embodiments could lead to residual noise. In order to whiten the residual noise, the transmitted probing signal could be randomized. Since the transmitted probing signal timing, size and shape is known, the receiver can still recover the probing signal. The randomization causes the residual estimation or cancellation noise to become white.

Therefore the noise cancellation methods discussed in the various embodiments could be used to cancel out the residual noise as well. In particular, averaging noise cancellation techniques would also cancel out the randomized residual noise. The randomization can be done to different characteristics of the transmitted probe signal, such as shape, timing, and power. One exemplary randomization would be the transmission time jittering. The starting time of the probing signal could be randomized with a known pattern. The randomization pattern would be known at the receiver therefore the received probing signal could be recovered. However, as a result of the timing jitter, the residual noise after cancelling Data or Sync Symbols would be randomized and the resulting noise would resemble white noise. Therefore, subsequently, noise cancellation methods, such as averaging, could cancel out the residual noise.

The invention claimed is:

1. A method comprising:
transmitting a probing signal on the twisted pair telephone line from a Digital Subscriber Line (DSL) device coupled to the line, wherein the probing signal is transmitted in a frequency used for upstream data transmission or downstream data transmission in a DSL system that employs frequency-division duplexing of upstream and downstream data transmission, in one of an upstream direction from a customer premises location or a downstream direction from a central office location, during one of a DSL data transmission period or DSL sync symbol transmission period;
receiving the probing signal reflected on the twisted pair telephone line at the DSL device;
removing an estimate of one of a DSL data transmission signal or DSL synch symbol transmission signal from the received probing signal to recover the reflected probing signal; and
processing the recovered reflected probing signal to determine characteristics information of the twisted pair telephone line.

2. The method of claim 1, wherein a power of the probing signal is kept at a signal to noise ratio that is substantially equal to or less than a noise power of a twisted pair telephone line during a period of DSL data transmission or a DSL synch symbol transmission on the line.

3. The method of claim 1, wherein the probing signal is selected from a group of signals consisting of a pulse signal, a step time domain reflectometry (TDR) signal, a spread spectrum signal, a nominal modem transmission signal, a chirp signal, an impulse train signal, and a single impulse signal.

4. The method of claim 1, wherein receiving a probing signal reflected on a twisted pair telephone line at a DSL device comprises receiving the reflected probing signal at a DSL device selected from a group of DSL devices consisting of a line testing device, a DSL modem, a DSLAM, a DSL subscriber's computing device, and a set-top box.

5. The method of claim 1, further comprising removing noise from the received probing signal.

6. The method of claim 5, wherein the noise is removed from the received probing signal before removing the estimate of one of a data signal or synch symbol signal from the received probing signal to recover the reflected probing signal.

7. The method of claim 5, wherein the noise is removed from the received probing signal after removing the estimate of one of a data signal or synch symbol signal from the received probing signal to recover the reflected probing signal.

8. The method of claim 5, wherein removing noise from the received probing signal comprises receiving a plurality of samples of the probing signal and averaging the samples to remove the noise from the received probing signal.

9. The method of claim 1, further comprising obtaining the estimate of one of a data signal or synch symbol signal for use in removing the estimate from the received probing signal to recover the reflected probing signal.

10. The method of claim 9, wherein obtaining the estimate comprises receiving the estimate from a DSL receiver of a DSL modem.

11. The method of claim 1, wherein to determine line characteristics information comprises computing a parameter that represents a characteristic of the twisted pair telephone line based on the recovered reflected probing signal, and wherein the characteristic is selected from a group of characteristics consisting of: a return loss, an impedance, an echo path response, a detection of a presence of a bridged tap, a characterization of the detected bridged tap, and an estimate of loop attenuation.

12. A DSL device comprising:
  an interface coupled to a twisted pair telephone line to transmit a probing signal on the twisted pair telephone line and to receive the probing signal reflected on the line, wherein the probing signal is transmitted in a frequency used for upstream data transmission or downstream data transmission in a DSL system that employs frequency-division duplexing of upstream and downstream data transmission, in one of an upstream direction from a customer premises location or a downstream direction from a central office location, during one of a DSL data transmission period or DSL sync symbol transmission period;
  logic coupled to the interface to remove an estimate of one of a DSL data transmission signal or DSL synch symbol transmission signal from the received probing signal to recover the reflected probing signal; and
  processing logic coupled to the logic to process the recovered reflected probing signal to determine characteristics information of the twisted pair telephone line.

13. The DSL device of claim 12, wherein the probing signal is selected from a group of signals consisting of a pulse signal, a step time domain reflectometry (TDR) signal, a spread spectrum signal, a nominal modem transmission signal, a chirp signal, an impulse train signal, and a single impulse signal.

14. The DSL device of claim 12, wherein the DSL device is selected from a group of DSL devices consisting of a line testing device, a DSL modem, a DSLAM, a DSL subscriber's computing device, and a set-top box.

15. The DSL device of claim 12, further comprising logic to remove noise from the received probing signal either before removing the estimate of one of a data signal or synch symbol signal from the received probing signal to recover the reflected probing signal or after removing the estimate of one of a data signal or synch symbol signal from the received probing signal to recover the reflected probing signal.

16. The DSL device of claim 12, wherein the logic coupled to the interface to remove an estimate of one of a DSL data transmission signal or DSL synch symbol transmission signal from the received probing signal obtains the estimate from a DSL receiver of a DSL modem.

* * * * *